United States Patent [19]

Koizumi

[11] Patent Number: 4,717,963
[45] Date of Patent: Jan. 5, 1988

[54] IMAGE INFORMATION READ APPARATUS

[75] Inventor: Shigeru Koizumi, Yono, Japan

[73] Assignee: Canon Kabushiki Kaisha, Tokyo, Japan

[21] Appl. No.: 873,066

[22] Filed: Jun. 4, 1986

Related U.S. Application Data

[63] Continuation of Ser. No. 804,240, Dec. 3, 1985, abandoned, which is a continuation of Ser. No. 590,952, Mar. 19, 1984, abandoned.

[30] Foreign Application Priority Data

Mar. 25, 1983 [JP] Japan .................... 58-48997
Dec. 7, 1983 [JP] Japan .................... 58-229891

[51] Int. Cl.$^4$ ............................. H04N 1/40
[52] U.S. Cl. ....................... 358/282; 358/293
[58] Field of Search ............... 358/280, 282, 284, 163, 358/293, 294; 382/54, 50

[56] References Cited

U.S. PATENT DOCUMENTS 3,976,833 8/1976 Lavery ...................... 358/282
4,149,143 4/1979 Hagano et al. ............. 382/53
4,174,528 11/1979 White ....................... 358/282
4,408,231 10/1983 Bushaw et al. ............ 358/282
4,520,395 5/1985 Abe ......................... 358/282

Primary Examiner—Edward L. Coles, Sr.
Attorney, Agent, or Firm—Fitzpatrick, Cella, Harper & Scinto

[57] ABSTRACT

In an image information read apparatus, shading distortion data of a light source are stored in a plurality of memory means, and the shading distortion data is read out of one of the memory means depending on a position of an original document. Content, of one of the plurality of memory means is retained even after the turn-off of a power supply. By this arrangement, a proper shading distortion correction is always attained at any position of the inserted original document even when the original document is partially scanned from an intermediate point, a proper initial value for shading distortion correction can be inputted so that a proper shading correction is attained to improve a quality of image.

22 Claims, 14 Drawing Figures

FIG. 5B 
WRITE IN MEMORY   READ FROM MEMORY

IMAGE INFORMATION READ APPARATUS

This application is a continuation of application Ser. No. 804,240 filed Dec. 3, 1985, which is a continuation of Ser. No. 06/590,952 filed 3/19/84 both now abandoned.

BACKGROUND OF THE INVENTION

1. Field of the Invention

The present invention relates to an image information reading apparatus which corrects a shading distortion of a light source based on data stored in memory means, when image information is read.

2. Description of the Prior Art

Figure 1:
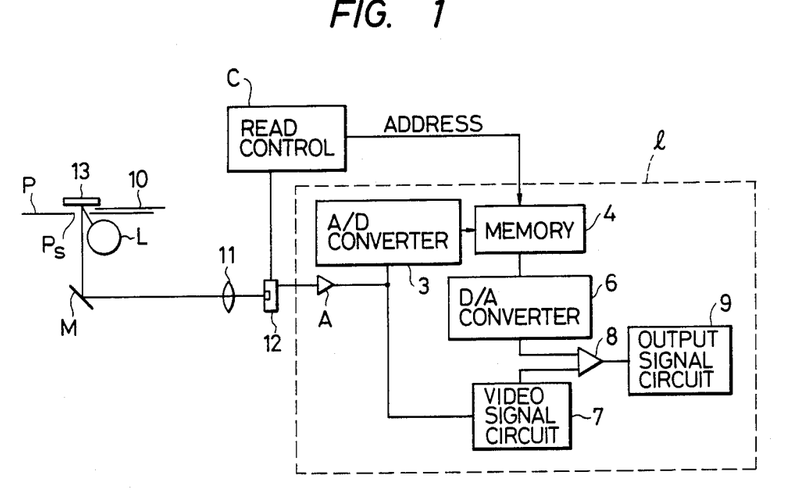
FIG. 1 shows a configuration of a prior art image information read apparatus.

In an apparatus such as a copying machine or a facsimile machine which illuminates an original document image by means of a light source and processes an image based on reflected light, a shading distortion correction is essential. In a plane scan type facsimile machine which uses a linear light source such as a fluorescent lamp, a light intensity is insufficient at an edge of the original document and a shading distortion occurs. In the past, an image information read apparatus having a shading distortion correction device as shown in FIG. 1 is used. In FIG. 1, a standard white plate 13 having a uniform reflection coefficient which is illuminated by a light source L through a slit Ps formed in an original document platform P is focused onto an photoelectric conversion means 12 (e.g. CCD) through a mirror M and an optical system 11 such as a lens. The photoelectric conversion means 12 sequentially reads out information under the control of a read controller C which controls device timing, and the read information is amplified by an amplifier A, converted to a digital signal by an A/D converter 3 and the digital signal is sequentially stored in a memory 4 in accordance with an address signal supplied from the read controller C.

Figure 2A:
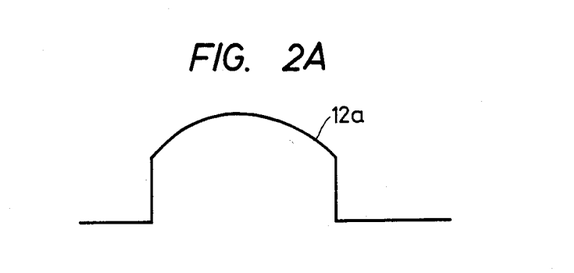
FIG. 2A shows shading distortion data.
Figure 2B:
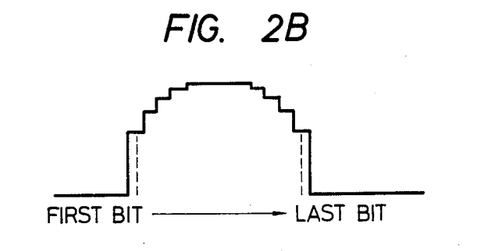
FIG. 2B shows shading distortion data derived by A/D converting the data shown in FIG. 2A.

If a shading distortion is included, the output from the amplifier A has a waveform as shown in FIG. 2A. It is quantized into a waveform as shown in FIG. 2B and the respective bits are stored at the corresponding addresses of the memory 4. This data represents a shading distortion data (light intensity distribution data).

Figure 3:
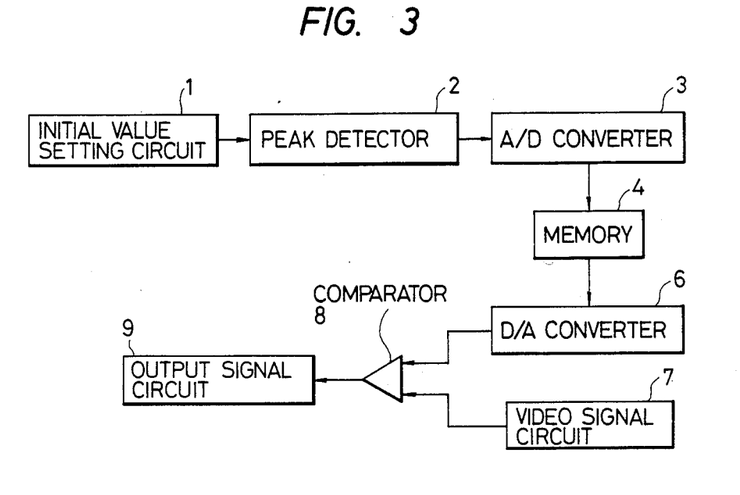
FIG. 3 shows a block diagram of a circuit surrounded by a broken line l in FIG. 1.

FIG. 3 shows a block diagram of the circuit surrounded by a broken line l in FIG. 1. In FIG. 1, numeral 1 denotes an initial value setting circuit which receives the output of the photoelectric converter such as CCD which receives a light reflected from the standard white plate illuminated by the light source. The initial value signal is supplied to a peak detector 2 which detects a peak value 12a shown in FIG. 2A, and the signal is converted to a digital signal by the A/D converter 3 with reference to the peak value. The digital data is then stored in the memory 4.

In a read operation, the data stored in the memory 4 is sequentially read out in accordance with a read scan position, converted to analog data by the D/A converter 6, the output of which is supplied to a comparator 8 to correct a slicing level.

A video signal from a video signal circuit 7 derived by the read scan is supplied to the comparator 8 and a binary output signal 9 is produced by the corrected slicing level.

In this system, the shading distortion correction is essentially correctly made if the initial value is correctly set. However, the correct initial value may not be set depending on conditions such as operating method.

For example, in a facsimile machine, when an operator wants to transmit an image from an intermediate point of an original document, the original document is inserted up to the read position. Since the standard white plate 13 is usually arranged near the read position in the facsimile machine as shown in FIG. 1, the inserted original document 10 is in front of the standard white plate 13. Thus, the original document image is read when the initial value is to be set and the standard white plate 13 is hidden by the original document 10. As a result, a correct initial value is not set and a correct binarization is not attained.

SUMMARY OF THE INVENTION

It is an object of the present invention to provide an image information reading apparatus which can correct a shading distortion without being affected by an original document image when the image is transmitted from an intermediate point of the original document.

It is another object of the present invention to provide an image information reading apparatus which retains one of a plurality of memory means which contain shading distortion correction data even after the turn-off of a power supply.

It is another object of the present invention to provide an image information reading device which corrects a shading distortion to always reproduce a high quality of image.

DETAILED DESCRIPTION OF THE PREFERRED EMBODIMENTS

The present invention is now explained with reference to the preferred embodiments shown in the drawings, in which the like elements to those of the prior art are designated by the like numerals and the explanation thereof is omitted.

Figure 4:
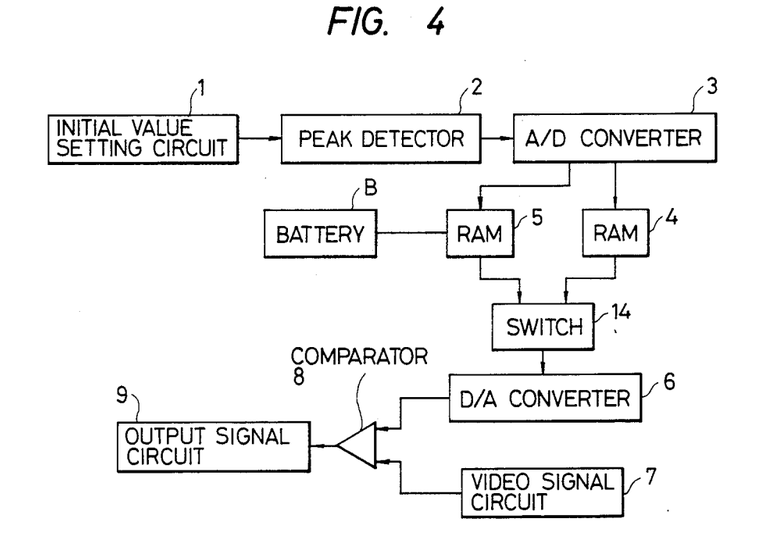
FIG. 4 shows a block diagram of a first embodiment of the present invention.

FIG. 4 shows a block diagram of one embodiment of the image information read apparatus of the present invention.

In the present invention, an initial value obtained by illuminating the standard white plate is processed by the peak detector 2 and the A/D converter 3, and then stored in the memory. Two memories, a RAM (random access memory) 4 and a RAM 5 are provided and the RAM 4 is usually used in a conventional method.

A backup battery B is connected to the RAM 5 so that the memory content thereof is retained even after a power supply of the apparatus is turned off. correct shading distortion data derived by illuminating the standard white plate is stored in the RAM 5.

The shading distortion data stored in the RAM 4 and the RAM 5 are selectively read out and the selected data is converted to an analog signal by the D/A converter 6 and the analog signal is compared with the video signal 7 by the comparator 8 to produce the binary output signal 9.

Signals at various elements are shown in FIGS. 5A–5D.

Figure 5A:
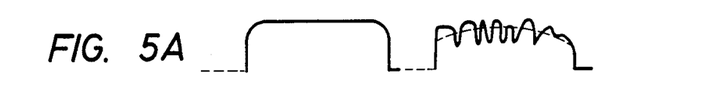
FIGS. 5A-5D show waveforms of signals in the circuit of FIG. 4.

The leftside waveform of FIG. 5A shows a correct initial value "1", that is, an intensity distribution over an entire width of the photoelectric conversion element, derived by illuminating the standard white plate.

The rightside solid line waveform shows the video signal 7 produced by the photoelectric conversion element when the image is read, and a broken line shows a correct slicing level corrected for the shading distortion based on the initial value shown on the left hand.

Figure 5B:
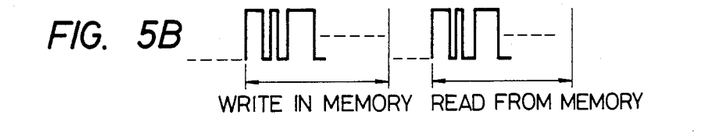

The initial value on the left hand of FIG. 5A is converted to the digital signal as shown in FIG. 5B by the peak detector 2 and the A/D converter 3 and the digital signal is stored in the RAM 4 or the RAM 5. The rightside waveform of FIG. 5B shows the shading distortion read from the RAM 4 or 5.

Figure 5C:
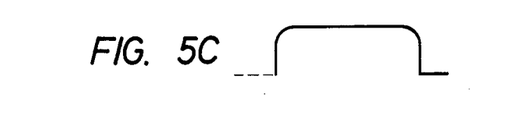

The digital signal read from the RAM 4 or 5 is reconverted to the analog signal as shown in the D/A converter 6, and the shading distortion as shown in FIG. 5C is reproduced.

Figure 5D:
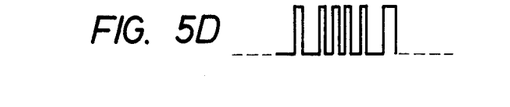

The corrected slicing level shown on the left hand side of FIG. 5A is obtained based on the reproduced shading distortion, and it is compared with the solid line video signal 7 of FIG. 5A by the comparator 8 so that the binary output signal 9 shown in FIG. 5D is produced.

With this arrangement, when the correct initial value is not inputted, the correct shading distortion stored in the RAM 5 is used so that the correct shading distortion is always reproduced and the slicing level is corrected based on the correct shading distortion. Accordingly, the correct binary output is produced.

Figure 6:
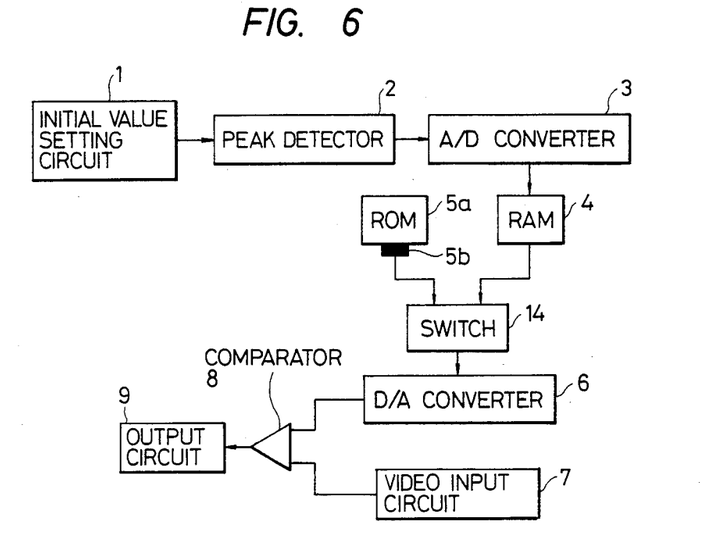
FIG. 6 shows a block diagram of a second embodiment of the present invention.

FIG. 6 shows a second embodiment of the present invention.

In the present embodiment, the RAM 4 for storing the A/D-converted shading distortion data and a ROM 5a (read-only memory) which contains the shading distortion data without the image information are used.

According to the present embodiment, when the correct shading distortion is not obtained, that is, when the initial value signal 1 including the image information is inputted, the memory is switched from the RAM 4 to the ROM 5a by the switch 14 and the correct the shading distortion data is read from the ROM 5a. This shading distortion data is D/A-converted by the D/A converter 6 to reproduce the shading distortion, and the slicing level is compared with the video input signal 7 by the comparator 8 to produce the binary output 9.

Figure 7:
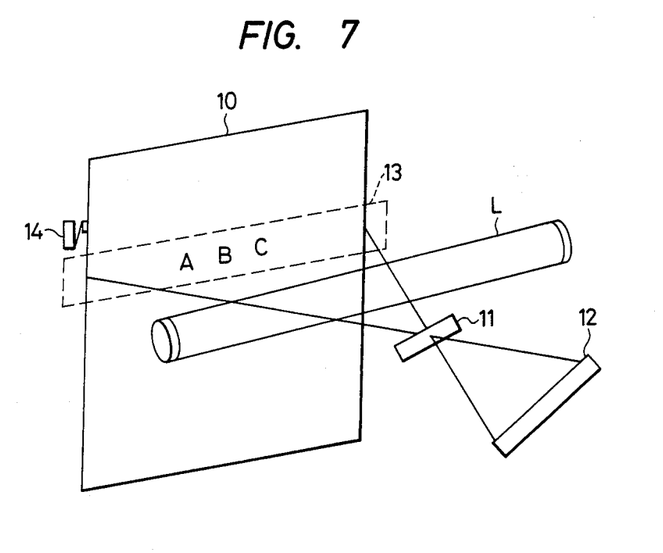
FIG. 7 shows a specific embodiment of the present invention.

The switching from the RAM 4 to the ROM 5a may be effected by an original document sensor such as the microswitch 14 shown in FIG. 7, which senses the original document when it is inserted to switch the memory from the RAM 4 to the ROM 5a.

In this manner, the correct binary image output is produced by adding the ROM 5a which contains the correct shading distortion data, and a partial transfer can be attained even when the original document is inserted from an intermediate point in the facsimile machine.

Since the shading distortion of the fluorescent lamp which is the light source does not significantly vary, the shading distortion correction based on the shading distortion data stored in the ROM 5a does not produce much error and a practically acceptable binary output is obtained even if a correct shading distortion correction for a background density of the original document is not attained. By providing a connector 5b to the ROM 5a so that the ROM 5a is pluggable and exchangeable, the intensity distribution data of the ROM can be corrected.

FIG. 7 diagrammatically shows an image reader of the facsimile machine in accordance with the present invention.

In FIG. 7, numeral 10 denotes an original document containing an image ("ABC...") to be read. The image of the original document 10 is illuminated by a light source L such as a fluorescent lamp, and reflected light therefrom is focused on a photoelectric conversion element 12 such as a CCD through an optical system 11 such as a lens. A standard white plate 13 is arranged at an image read position beneath the optical system 11 and the photoelectric conversion element 12. A sensor for sensing the original document 10 is mounted near the standard white plate 13. The microswitch 14 is shown as the sensor although another sensor such as a photocoupler may be used.

With this arrangement, the light source L is turned on to illuminate the standard white plate 13, and the reflected light therefrom is focused onto the photoelectric conversion element 12 through the optical system 11 to input the initial value for the shading distortion correction.

If the microswitch 14 is not actuated, that is, if the original document 10 is not inserted to the position of the microswitch 14 when the initial value is inputted, the reflection light from the standard white plate 13 is obtained, and the resulting initial value is stored in the RAM 4 and the RAM 5 shown in FIG. 4 and the image is read, and the shading distortion data stored in the RAM 4 is used to binarize the signal.

If the microswitch 14 is actuated when the initial value is inputted, it is considered that the original document 10 is on the standard white plate 13 and the correct initial value is not obtained from the image of the original document. Accordingly, the initial value is not set. (The initial value may be temporarily read and stored in the RAM 4.) When the image is read and binarized, the shading distortion data stored in the RAM 5 is used.

The above control may be effected by the controller C such as a microcomputer shown in FIG. 1.

With this arrangement, even when the original document 10 is inserted to the read position, the error of the initial value due to the original document image is prevented and the correct shading distortion correction is always attained. Thus, in the facsimile machine, the original document may be inserted to the read position to transmit the image from the intermediate point of the original document. Since the RAM 5 of FIG. 4 is backed up by the battery B, it always retains the correct shading distortion data for the correct initial value. Thus, the correct shading distortion correction is attained in the apparatus such as facsimile machine in which the power supply is turned off except when the image is transmitted.

In the facsimile machine, the initial value may be inputted at a predetermined timing such as at a boundary of the original document sheets. Thus, the shading distortion due to the degradation of the light source or the contamination of the optical system can be corrected in accordance with the background density of the original document.

While the RAM 5 is continuously backed up by the battery 15 in the above embodiment, the battery 15 may be omitted and, instead, the content of the RAM 5 may be updated at a timing at which the correct initial value is obtained, such as when the power supply is turned on. When the ROM 5a shown in FIG. 6 is used, the battery can be omitted. While the correctness of the initial value is determined by whether the original document is present near the standard white plate 13 or not in the above embodiment, the correctness of the initial value may be determined by another method.

The present invention is not limited to the facsimile machine but it is applicable to any image processing apparatus which corrects the shading distortion. While the linear photoelectric conversion device is shown in the above embodiment, the shape of the photoelectric conversion device, the scan system and the shape of the standard white plate may be changed depending on the apparatus to which the present invention is applied.

As described hereinabove, according to the present invention, in the image information read apparatus which processes the image based on the shading distortion measured, a plurality of memory means for storing the shading distortion data are provided, and when the correct shading distortion initial value is not obtained, the shading distortion data stored in one of the memory means is used to process the image. Thus, the correct shading image can always been reproduced to process the image.

Figure 8A:
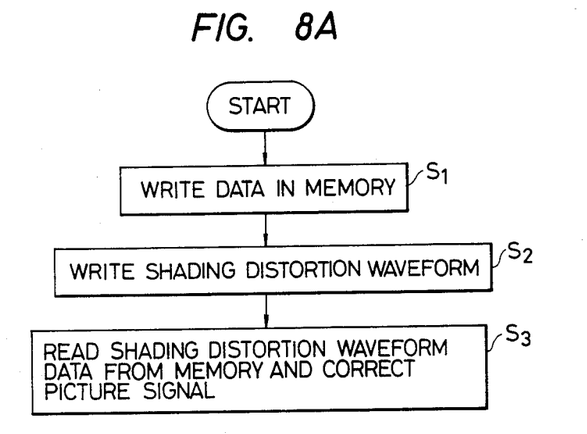
FIGS. 8A-8C show flow charts for explaining the operations in FIGS. 3, 4 and 6, respectively.
Figure 8B:
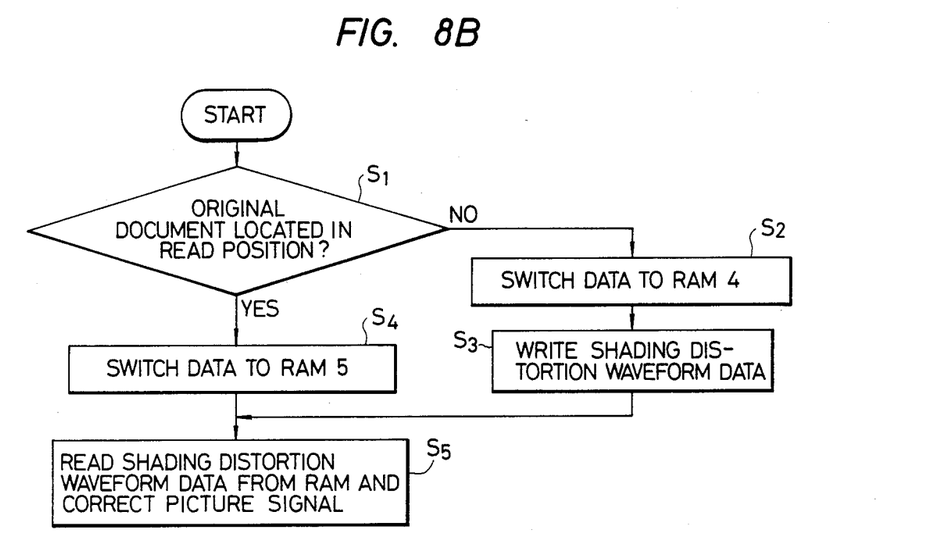
Figure 8C:
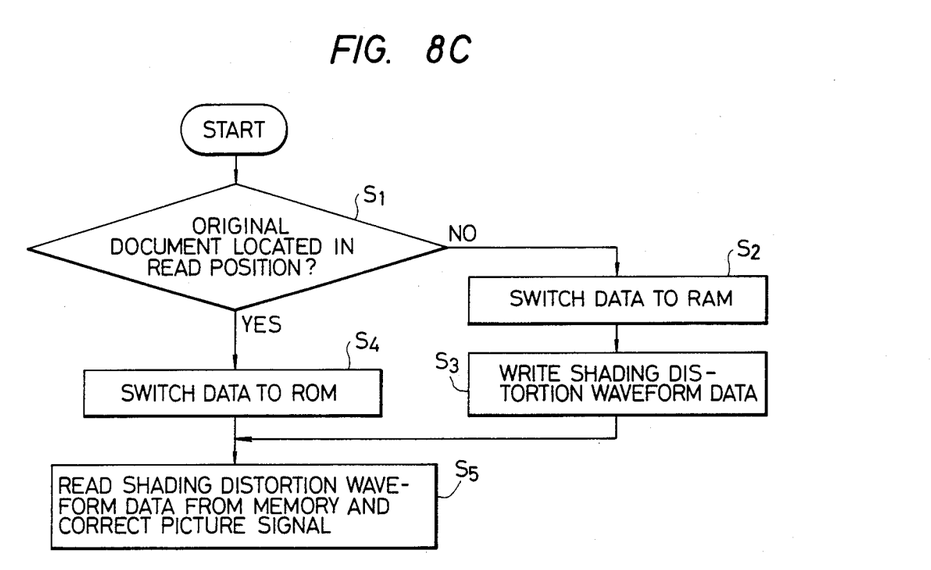

FIGS. 8A–8C show flow charts, in which FIG. 8A shows a flow chart for FIG. 3, FIG. 8B shows a flow chart for FIG. 4, and FIG. 8C shows a flow chart for FIG. 6. In a step S1 of FIG. 8A, the data is written into the memory, in a step S2, the shading distortion data is written, and in a step S3, the shading distortion data is read from the memory to correct to image signal.

On the other hand, in FIGS. 8B and 8C, the presence or absence of the original document at the read position is checked in a step S1. This is a feature of the present invention. The microswitch 14 shown in FIG. 7 senses the presence or absence of the original document.

In FIG. 8B, if a decision in a step S1 is NO, the shading distortion data is switched to the RAM 4 in a step S2 and it is stored in the RAM 4 in a step S3. If the decision in the step S1 is YES, the shading distortion data is switched to the RAM 5 in a step S4. Then, the program proceeds to a step S5. In the step S5, the shading distortion data is read from the RAM 4 or the RAM 5 to correct the image signal.

In FIG. 8C, if a decision in a step S1 is NO, the shading distortion data is switched to the RAM in a step S2 and it is stored in the RAM in a step S3. If the decision in the step S1 is YES, the shading distortion data is switched to the ROM. Then, the process proceeds to a step S5. In the step S5, the shading distortion data is read from the RAM or the ROM to correct the image signal.

What is claimed is:

1. An image information read apparatus comprising:
   illumination means for illuminating an original document;
   reflection means arranged in a path of said original document for reflecting a light from said illumination means;
   photoelectric conversion means for converting an optical image information reflected from said original document or an optical intensity distribution data reflected from said reflection means to an electrical signal;
   a plurality of memory means for storing the optical intensity distribution data at a position of said reflection means;
   selection means for reading the optical intensity distribution data from one of said plurality of memory means depending on the presence or absence of said original document; and
   comparison means for comparing the optical intensity distribution data from said selection means with the image information from said photoelectric conversion means.

2. An image information read apparatus according to claim 1 wherein one of said plurality of memory means retains the memory control by a battery power supply.

3. An image information read apparatus according to claim 1, wherein one of said plurality of memory means is a read-only memory and the other of said plurality of memory means is a writable and readable memory.

4. An image information read apparatus according to claim 3 wherein said read-only memory has a pluggable connector to allow exchange with another read-only memory.

5. An image information read apparatus comprising:
   photoelectric conversion means for focusing an image of an original document when the original document is present and detecting a light intensity distribution at a predetermined position when said original document is not present, and converting an optical information data to an electrical signal;
   first memory means containing a predetermined light intensity distribution data;
   second memory means for storing the light intensity distribution data at said predetermined position supplied from said photoelectric conversion means;
   selection means for detecting the presence or absence of the original document at a predetermined position, selecting the signal supplied from said first memory means when the presence of the original document is detected, and selecting the signal supplied from said second memory means when the absence of the original document is detected; and
   comparison means for comparing the image information of the original document supplied from said photoelectric conversion means with the light intensity distribution data supplied from said selection means.

6. An image information read apparatus according to claim 5 wherein said first memory means is a random access memory backed up by a battery and said second memory means is another random access memory.

7. An image information read apparatus according to claim 5 wherein said first memory means is a read-only memory having a pluggable connector and said second memory means is a random access memory.

8. An image information read apparatus comprising:
   photoelectric conversion means for focusing an image of an original document when the original document is present, detecting a light intensity distribution at a predetermined position when said original document is not present, and converting an optical image information to an electrical signal;
   first conversion means for converting the light intensity distribution analog data at said predetermined position supplied from said photoelectric conversion means to a digital signal;

a plurality of memory means for storing the signal supplied from said first conversion means;

selection means for detecting the presence or absence of the original document at a predetermined position, selecting the signal supplied from one of said memory means when the presence of the original document is detected, and selecting the signal supplied from the other of said memory means when the absence of the original document is detected;

second conversion means for converting the digital signal selected by said selection means to an analog signal; and comparison means for comparing the image information of the original document supplied from said photoelectric conversion means with the light intensity distribution data supplied from said second conversion means.

9. An image information read apparatus according to claim 8, wherein one of said memory means is a random access memory backed up by a battery, and the other of said memory means is a random access memory.

10. An image information read apparatus comprising:

illumination means for illuminating an original document;

reflection means for reflecting light from said illumination means;

photoelectric conversion means for converting optical image information reflected from the original document or optical intensity distribution data reflected from said reflection means to an electrical signal;

first memory means for storing the optical intensity distribution data from said photoelectric conversion means;

second memory means for storing predetermined optical intensity distribution data;

selection means for reading the optical intensity distribution data selectively from either one of said first and second memroy means; and correcting means for correcting the image information from said photoelectric conversion means using the optical intensity distribution data read by said selection means, wherein said selection means performs the selecting operation in accordance with the presence or absence of an original document.

11. An image information read apparatus according to claim 10, wherein said second memory means is a read-only memory and said first memory means comprises a writable and readable memory.

12. An image information read apparatus according to claim 11, wherein said read-only memory has a pluggable connector to allow exchange with another read-only memory.

13. An image information read apparatus according to claim 10, wherein said correcting means is operable to correct a quantizing operation for the image information in accordance with the optical intensity distribution data.

14. An image information read apparatus comprising:

reading means for photoelectrically reading an image of an original document;

detection means for detecting disunity in output of said reading means owing to shading distortion;

first memory means for storing data representative of the disunity detected by said detection means;

second memory means for storing predetermined data representative of disunity in the output of said reading means; and correcting means for correcting image data representative of the image of the original document from said reading means in accordance with the data stored in said first and second memory means, wherein said correcting means is operable to select the data stored in either one of said first or second memory means in accordance with the presence or absence of an original document.

15. An image information read apparatus according to claim 14, wherein said second memory means is a read-only memory and said first memory means comprises a writable and readable memory.

16. An image information read apparatus to claim 14, wherein said detection means is operable to detect the disunity based on an output from said reading means, which output is generated when said reading means reads a reference portion.

17. An image information read apparatus according to claim 14, wherein said correcting means is operable to correct a quantized operation for the image data in accordance with the data stored in said first and second memory means.

18. An image information read apparatus comprising:

illumination means for illuminating an original document;

reflection means for reflecting light from said illumination means;

photoelectric conversion means for converting optical image information reflected from the original document or optical intensity distribution data reflected from said reflection means to an electrical signal;

memory means for storing the optical intensity distribution data from said photoelectric conversion means;

control means for controlling said memory means in such a manner that in the case of absence of the original document, the optical intensity distribution data from said photoelectric conversion means is newly stored in said memory means, and the newly stored optical intensity distribution data is read out from said memory means, and in the case of presence of the original document, the otpical intensity distribution data which has been already stored in said memory means, is read out from said memory means; and correcting means for correcting the image information from said photoelectric conversion means using the optical intensity distribution data read out from said memory means.

19. An image information read apparatus according to claim 18, wherein said memory means comprises a random access memory.

20. An image information read apparatus according to claim 19, wherein said random access memory is backed up by a battery.

21. An image information read apparatus according to claim 18, wherein said reflection means is arranged in a path of the original document.

22. An image information read apparatus according to claim 18, wherein said correcting means is operable to correct a quantizing operation for the image information in accordance with the optical intensity distribution data.

* * * * *

UNITED STATES PATENT AND TRADEMARK OFFICE
CERTIFICATE OF CORRECTION

PATENT NO. : 4,717,963
DATED : January 5, 1988
INVENTOR(S) : SHIGERU KOIZUMI

It is certified that error appears in the above-identified patent and that said Letters Patent is hereby corrected as shown below:

AT [54] IN THE TITLE

"READ" should read --READING--.

AT [56] IN THE REFERENCES

U.S. Patents, "Hagano et al." should read --Nagano et al.--.

AT [57] IN THE ABSTRACT

Line 5, "Content," should read --Content--.

COLUMN 1

Line 2, "READ" should read --READING--.
Line 29, "an" should read --a--.

COLUMN 2

Line 68, "correct" should read --Correct--.

COLUMN 3

Line 52, "the" (fourth occurrence) should be deleted.

UNITED STATES PATENT AND TRADEMARK OFFICE
CERTIFICATE OF CORRECTION

PATENT NO. : 4,717,963
DATED : January 5, 1988
INVENTOR(S) : SHIGERU KOIZUMI

It is certified that error appears in the above-identified patent and that said Letters Patent is hereby corrected as shown below:

COLUMN 8

Line 16, "apparatus to" should read --apparatus according to--.
Line 46, "otpical" should read --optical--.

Signed and Sealed this

Nineteenth Day of July, 1988

Attest:

DONALD J. QUIGG

Attesting Officer        Commissioner of Patents and Trademarks